(12) United States Patent
Kitamura et al.

(10) Patent No.: US 7,654,692 B2
(45) Date of Patent: Feb. 2, 2010

(54) SPREAD ILLUMINATING APPARATUS

(75) Inventors: Atsushi Kitamura, Kitasaku-gun (JP); Shigeyuki Adachi, Kitasaku-gun (JP)

(73) Assignee: Minebea Co., Ltd., Nagano (JP)

( * ) Notice: Subject to any disclaimer, the term of this patent is extended or adjusted under 35 U.S.C. 154(b) by 172 days.

(21) Appl. No.: 11/808,712

(22) Filed: Jun. 12, 2007

(65) Prior Publication Data
US 2008/0007950 A1    Jan. 10, 2008

(30) Foreign Application Priority Data
Jul. 10, 2006   (JP) .............................. 2006-189645

(51) Int. Cl.
*F21S 4/00* (2006.01)
*F21V 21/00* (2006.01)

(52) U.S. Cl. ................. 362/249.03; 362/97.3; 362/239; 362/249.1; 362/269; 362/287; 362/612; 362/800

(58) Field of Classification Search ......... 362/232–233, 362/249–250, 269, 287, 800, 97.3, 239, 612
See application file for complete search history.

(56) References Cited

U.S. PATENT DOCUMENTS 6,814,459 B2 *  11/2004  Pederson ...................... 362/35

FOREIGN PATENT DOCUMENTS

| JP | A 2000-66168 | 3/2000 |
| JP | B2-3653274 | 5/2005 |
| JP | A-2005-221619 | 8/2005 |

* cited by examiner

*Primary Examiner*—Jason Moon Han
(74) *Attorney, Agent, or Firm*—Oliff & Berridge, PLC

(57) ABSTRACT

A spread illuminating apparatus includes a plurality (m×n pieces) of lighting units ($P_{11}$ to $P_{mn}$) which are disposed in a matrix with m rows and n columns, and each of which is an edge light type principally including a light conductor plate and at least one LED disposed at one side of the light conductor plate, and the entire luminous region of the spread illuminating apparatus is divided into segment areas constituted respectively by the lighting units ($P_{11}$ to $P_{mn}$) which can be turned on and off in a controlled manner independently of one another.

5 Claims, 4 Drawing Sheets

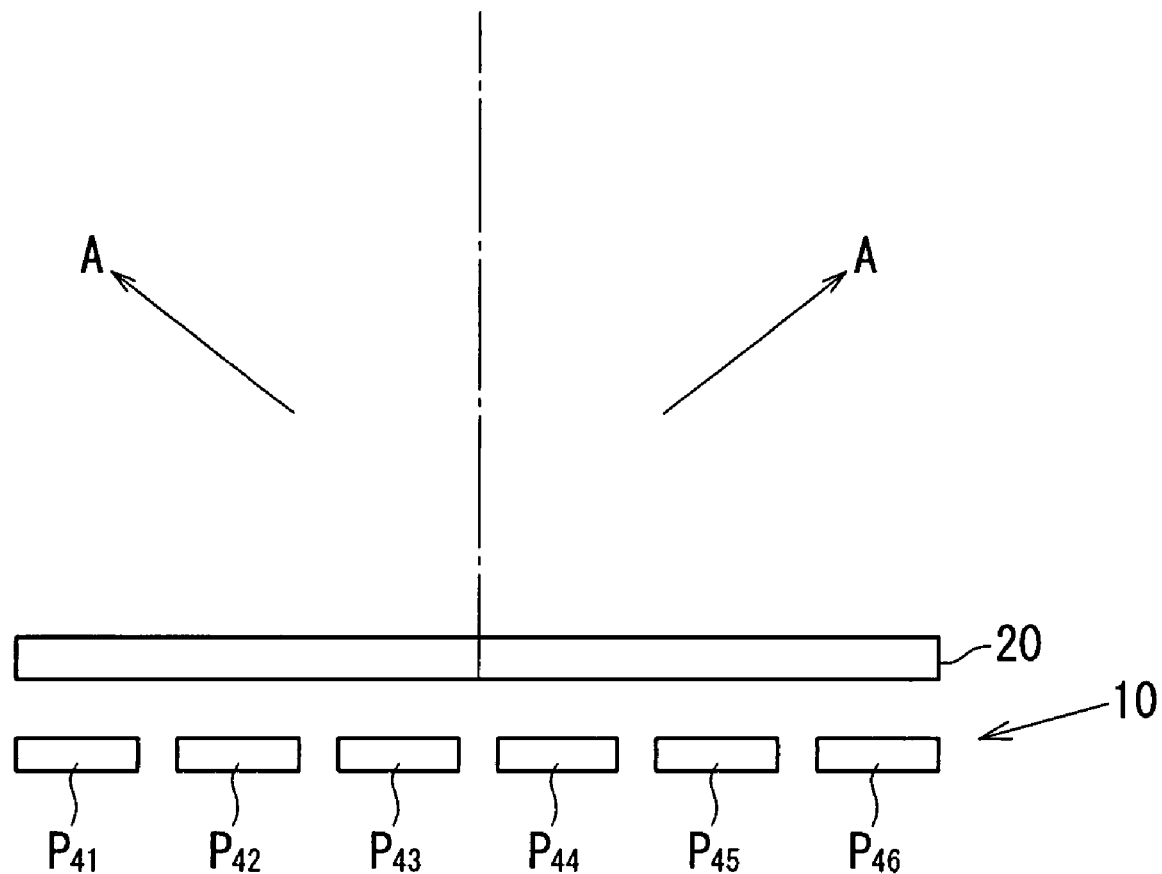

SPREAD ILLUMINATING APPARATUS

BACKGROUND OF THE INVENTION

1. Field of the Invention

The present invention relates to a spread illuminating apparatus suitable for use as a backlight unit for a liquid crystal display device.

2. Description of the Related Art

A liquid crystal display (LCD) device is extensively used as a display device for electronic appliances, and the like, and recently is increasingly replacing a cathode ray tube (CRT) also in a relatively large display device for such as a personal computer and a television set. For such a large LCD device, a direct light type backlight has been conventionally predominant which is structured such that a plurality of cold cathode lamps (hereinafter referred to as CCFLs as appropriate) as light sources are disposed immediately beneath an LCD panel, and in which light is condensed by an optical sheet and light intensity is uniformed by a diffuser sheet (refer to, for example, Japanese Patent No. 3653274).

In many of such direct light type backlights with CCFLs, all CCFLs are driven so as to be kept lighted at all times during a period when a picture image is displayed on the LCD panel, and an illuminating light basically has a predetermined view angle characteristic (that is to say, a characteristic inherent and specific to a backlight) such that brightness usually exhibits its peak when viewed from the front although means to improve the characteristic have been disclosed (refer to, for example, Japanese Patent Application Laid-Open No. 2005-221619).

In the meantime, recently, various approaches as described below are attempted for improving picture image quality and enhancing performance in an LCD device, and accordingly a backlight is becoming required to offer less conventional features.

For example, as a means of solving the visibility issue of movie display on an LCD panel, what is called a "pseudo impulse driving method" is established, in which a black display period is forcibly inserted between every two adjacent frame periods of a picture image display, whereby the pixel brightness response of the LCD panel is brought close to the impulse response.

In the pseudo impulse driving method, the black display period is proposedly produced by turning off the backlight, in which case the backlight is required to be capable of turning on and off rapidly. The black display period is also proposedly produced by inputting a black write signal in a picture image signal per frame period, in which case the backlight is preferably turned on and off rapidly in synchronization with the black write signal in order to achieve an efficient pseudo pulse impulse driving.

Especially, in case of an LCD panel with a rapid response, a method is proposed in which a black write signal is inserted in a picture image signal per scanning line at a predetermined timing, whereby a black region is displayed at an area of a screen composed of a plurality of successive scanning lines, and at the same time the position of the black region displayed is shifted in synchronization with the scanning of the picture image (hereinafter this method is referred to as "black insertion driving method" as appropriate). In this case, it is required that only an area of the entire luminous region of the backlight located immediately beneath the black region be selectively turned off in synchronization with the shifting of the black region.

Also, what is called an "area control method" is proposed, in which the lighting condition of the backlight is partly controlled for enhancing the contrast of a picture image and reducing the power consumption. In this method, the backlight is driven such that when a black region which does not need illumination is present in a picture image as a display tone factor, the area of the luminous region located immediately beneath the black region is selectively turned off.

Unlike the above-described black region (black display period) forcibly inserted for improving the movie display performance, the black region working as a display tone factor for picture image is caused to vary in shape and size on the screen. Consequently, in order to achieve an effective area control, the areas of the luminous region of the backlight, which are adapted to turn on and off independently of one another, must be configured sufficiently minute and precise.

As enhancement of performance, recently, a multiple view LCD device, such as a dual view LCD television, is proposed which enables display of multiple different picture images on one screen, such that each of lights which are emitted from a backlight and transmit pixels of an LCD panel is controlled so as not to reach an area beyond a given space region corresponding to the pixel the each light transmits, whereby respective display directions of a plurality of different picture images are separated from one another.

A backlight for such a multiple view LCD device is required to provide a view angle characteristic suitable for such a display mode that a plurality of display directions are present in one same screen. By forming a plurality of picture images into one same picture image, this type of LCD device also enables a display mode where a single picture image is viewed from the front like a normal LCD device, and so the backlight is desired to have a view angle characteristic adapted to flexibly respond to the switching of image display mode.

Conventional backlights, however, have the following difficulties in keeping up with the aforementioned improvement of image quality and enhancement of performance.

In a direct light type backlight with CCFLs, since a CCFL has a low response speed, and since the number of CCFLs provided in a backlight is usually restricted, commonly it is difficult to achieve a backlight to suitably match a pseudo impulse driving (especially, the above-described black insertion driving method).

Also, in a direct light type backlight with CCFLs, the luminous region cannot be divided into individual areas in the direction orthogonal to the length of the CCFLs because of its structure, and therefore the areas which are allowed to be area-controlled are forced to be very inadequately sized and shaped.

Meanwhile, recently, a direct light type backlight is proposed which employs, as light sources, a number of red (R), green (G) and blue (B) light emitting diodes (LEDs), in place of the CCFLs, arranged immediately beneath an LCD panel, wherein a white light is produced by mixing lights from these LEDs. Such a backlight may possibly evade the above-described problems with respect to the pseudo impulse driving and the area control.

However, the photoelectric conversion efficiency is low in achieving a white light by mixing lights from red, green and blue LEDs, thus raising problems with power consumption, heat value from light sources, cost, and the like for achieving a white light with an adequate brightness.

Further, the conventional direct light type backlight, regardless of using CCFLs or LEDs as light sources, has, as described above, a predetermined view angle characteristic such that the brightness is usually at its peak when viewed from the front. If such a backlight is used in a multiple view LCD device which has a display mode that multiple different picture images are displayed in a plurality of different directions, then the view angle characteristic of the backlight does not fit the display mode of the multiple view LCD device described above, and consequently the brightness characteristic proper to the backlight cannot be fully utilized thus inviting brightness deterioration of the LCD device. And, this brightness deterioration in the conventional backlight must usually be compensated for by increasing electric power inputted to the backlight, thus increasing power consumption.

SUMMARY OF THE INVENTION

The present invention has been made in light of the above problems, and it is an object of the present invention to provide a spread illuminating apparatus in which the entire luminous region is divided into a plurality of segment areas which can be lit individually and independently in a controlled manner and which have their respective light emitting directions set individually and independently.

In order to achieve the object described above, according to an aspect of the present invention, there is provided a spread illuminating apparatus including a plurality of lighting units which are arranged two dimensionally and can be turned on and off in a controlled manner independently of one another, and each of which includes a light conductor plate having one major surface as a light emitting surface and at least one light emitting diode (LED) disposed at one side of the light conductor plate, wherein the at least one light emitting diode includes a pseudo white LED.

In the spread illuminating apparatus according to the present invention, the lighting units adapted to turn on and off individually in a controlled manner are arranged in a two dimensional manner, whereby the entire luminous region of the spread illuminating apparatus is divided into segment areas each of which is constituted by the light emitting surface area of each lighting unit, thus easily allowing a partial control of turning on and off the luminous region of the spread illuminating apparatus. In this connection, if the light emitting areas of the lighting units are appropriately shaped and sized and also if the lighting units are appropriately arranged according to the shape and size, then the segment areas which can be turned on and off individually in a controlled manner can be flexibly arranged, and consequently the spread illuminating apparatus can be preferably used as a backlight of an LCD device incorporating an area control driving method.

In the spread illuminating apparatus according to the present invention, the lighting units are each what is called an "edge light type" which is structured such that one or more LEDs are disposed at one side of a light conductor plate having one major surface as a light emitting surface, and which is superior to a direct light type in uniformity of emitted light and light utilization efficiency and also allows reduction in apparatus profile.

Even when the illuminating apparatus requires a large luminous region, each of the lighting units which constitute the luminous region can be produced using an existing manufacturing technique (such as die machining, and molding) employed for a small or medium size spread illuminating apparatus, and also a small LED with a high luminous efficiency can be used as a light source of the lighting unit.

Further, the lighting unit using an LED can be turned on and off more rapidly than when a CCFL is used as a light source thus making the apparatus preferably suitable for use as a backlight of an LCD panel using a pseudo impulse driving method, and mercury is not contained in the light source thus reducing environmental burden.

Particularly, in the spread illuminating apparatus in which the entire luminous region is constituted such that the lighting units which use LEDs capable of turning on and off rapidly are arranged two dimensionally, the segment areas each corresponding to the light emitting surface of each lighting unit can be individually and rapidly turned on and off. Consequently, the spread illuminating apparatus can be used favorably as a backlight of an LCD panel using the above-described black insertion driving method, wherein only the segment areas located right beneath a black region are selectively turned off in synchronization with the shifting of the black region.

In view of the convenience of the operation described above, it is preferable that the light conductor plates of the lighting units be formed into a shape having two opposing sides parallel to each other, and that the lighting units be arranged with their two opposing sides oriented parallel to the scanning lines of a picture image on the LCD panel. More preferably, the light conductor plates of all the lighting units have the same rectangular shape, and the lighting units are arranged in a matrix manner such that two opposing sides of the light conductor plate are parallel to the horizontal scanning lines on the LCD panel while another two opposing sides are parallel to the vertical scanning lines on the LCD panel.

With the arrangement described above, by turning on and off the lighting units in a controlled manner column by column or row by row of the matrix depending on the scanning direction, the lighting state of the spread illuminating apparatus can easily respond to the shifting of the display position of the black region, which is synchronized with the scanning of an image.

The LEDs used as light sources of the lighting units include a pseudo white LED which generally has a higher efficiency of conversion into white light compared with when mixing lights from red, green and blue LEDs, thus contributing to reduction in electric power consumption. Such a pseudo white LED preferably includes a blue LED chip to emit a blue light (with a dominant wavelength of, for example, 400 nm to 480 nm), and a fluorescent substance (typically, YAG: Ce fluorescent material) to absorb the light from the blue LED chip and to emit a yellow light (with a dominant wavelength of, for example, 520 nm to 560 nm).

Since the lighting units are arranged two dimensionally and are of an edge light type structured such that one or more LEDs are disposed at one side of a light conductor plate have a major surface as a light emitting surface, the emitting directions of the lights from the lighting units with respect to an object to be illuminated can be easily controlled by appropriately determining the inclination angle of the light emitting surfaces of the light conductor plates of the lighting units relative to the object illuminated.

Thus, the view angle characteristic as the whole spread illuminating apparatus can be flexibly determined according to the application by appropriately adjusting the inclination angles of the light conductor plates of the lighting units relative to the object to be illuminated, for example, such that the brightness distribution has its peak in other direction than the front direction of the apparatus, or in a plurality of different directions.

In the aspect of the present invention, for example, the lighting units disposed two dimensionally may include a lighting unit group constituted by at least one lighting unit in which the light emitting surface of the light conductor plate is inclined at a predetermined angle relative to the object to be illuminated.

The object to be illuminated is typically, for example, an LCD panel of the aforementioned multiple view LCD device, and the light emitting surfaces of the light conductor plates, if arranged to be inclined by a predetermined angle relative to the LCD panel, can be directed along the display direction of a picture image in the LCD device. The predetermined angle is preferably set such that the peak direction of the brightness distribution of the lighting units arranged with such an inclination matches the image display direction (in other words, the angle falls within such a range as to determine a space region allowing only the picture image to be viewed).

In this connection, the lighting units preferably fall into different groups in a number identical with a number (for example, n) of picture images displayed, and each lighting unit group includes a plurality (for example, 1/n of the total number of the lighting units) of lighting units which are arranged to be inclined by an angle predetermined so as to be oriented to face along the corresponding image display direction.

Specifically, in case the spread illuminating apparatus according to the present invention is used as a backlight for a dual view LCD device displaying two different picture images on the same screen, one half of all the lighting units constituting a first lighting unit group are arranged to be inclined at a first angle relative to the LCD panel so that the light emitting surfaces of their light conductor plates are oriented to face along the display direction of one picture image, while the other half of all the lighting units constituting a second lighting unit group are arranged to be inclined at a second angle relative to the LCD panel so that the light emitting surfaces of their light conductor plates are oriented to face along the display direction of the other picture image. In this case, if the lighting units are arrayed in a matrix manner, the lighting units of the first group and the lighting units of the second group may be arrayed alternately column by column (or row by row).

Thus, the spread illuminating apparatus according to the present invention can be used preferably as a backlight of a multiple view LCD device, wherein the brightness characteristic of the lighting unit is fully leveraged thereby providing luminous light having a view angle characteristic suitable for such an image display mode, and an effective brightness in each of respective image display directions can be enhanced without increasing electric power applied to the spread illuminating apparatus (in other words, without requiring to increase an actual brightness of the spread illuminating apparatus).

In the aspect of the present invention, each of the lighting units may further include an angle adjusting means to adjust an inclination angle of the light emitting surface of the light conductor plate with respect to the object illuminated. With this structure, the view angle characteristic can be dynamically adjusted.

The multiple view LCD device described above enables a display mode where one same picture image is displayed in a plurality of different directions so that one picture image is viewed from the front (normal display mode) like a normal LCD device, as well as a display mode where different picture images are displayed respectively in a plurality of different directions (multiple display mode), and the picture images may be displayed while these display modes are switched over.

With the structure described above, the inclination angles of the lighting units relative to the object illuminated (LCD panel) can be adjusted such that at a multiple display mode, a plurality of lighting unit groups are formed wherein the lighting units of each group are inclined relative to the LCD panel by a specific predetermined angle different from those for the lighting units of the other groups so that the light emitting surfaces of the light conductor plates in respective groups are oriented so as to face along respective different display directions, while at a normal display mode, the light emitting surfaces of the light conductor plates of all the lighting units are oriented parallel to the LCD panel, thus enabling the view angle characteristic of the spread illuminating apparatus to be dynamically and flexibly optimized for each display mode upon the switching of the display modes in the multiple view LCD device.

The angle adjusting means is preferably constituted by an electric gonio stage which includes a stationary member, a movable member rotatably coupled to the stationary member, and a driving mechanism to rotate the movable member at least uniaxially about the rotation center existing outside the movable member, and each of the lighting units is placed on the movable member of each electric gonio stage.

In the aspect of the present invention, the LED of the lighting unit may include a red LED, whereby the insufficiency of a red light component in the light source constituted by a pseudo white LED alone is compensated for, and thereby, for example, a picture image signal having a wider color gamut than the current TV signal standard (BT. 709/Srg standard) can be duly covered.

The red color LED incorporated in the present invention can preferably be dimmer-controlled by, for example, adjusting the amount of driving current, whereby early color shift between the lighting units or color shift caused due to degradation of constituent elements of the lighting units may be corrected for the spread illuminating apparatus by dimmer-controlling the red LED based on the degree of the color shift.

The lighting unit of the spread illuminating apparatus according to the present invention may be constituted by a unit using a red LED only as a light source, in addition to by unit using a pseudo white LED only as a light source. Or alternatively, the lighting unit may be constituted by a unit using both a pseudo white LED and a red LED as a light source, wherein the light source may include both a pseudo white LED and a red LED as separate components, or may be formed as an LED as a single component, which includes a blue LED chip, a red LED chip and a yellow fluorescent substance, and which is adapted to mix three colors.

In the spread illuminating structured as described above according to the present invention, the entire luminous region is divided into a plurality of segment areas, at each of which light can easily be independently turned on and off in a controlled manner with its emission direction individually set. Consequently, the spread illuminating apparatus is suitable for use as a backlight of a multiple view LCD device of high image quality and high performance, in which a pseudo impulse driving method and an area control driving method are employed. And, with the spread illuminating apparatus according to the present invention, even a low cost LCD panel can constitute an LCD television featuring high brightness and contrast.

BRIEF DESCRIPTION OF THE DRAWINGS

FIG. 5 is a schematic view of the operation principle of the spread illumination apparatus of FIG. 1A used as a backlight for a dual view LCD device, showing a normal display mode viewed from the side of the LCD panel.

DETAILED DESCRIPTION OF THE INVENTION

An exemplary embodiment of the present invention will be described with reference to the accompanying drawings.

Figure 1A:
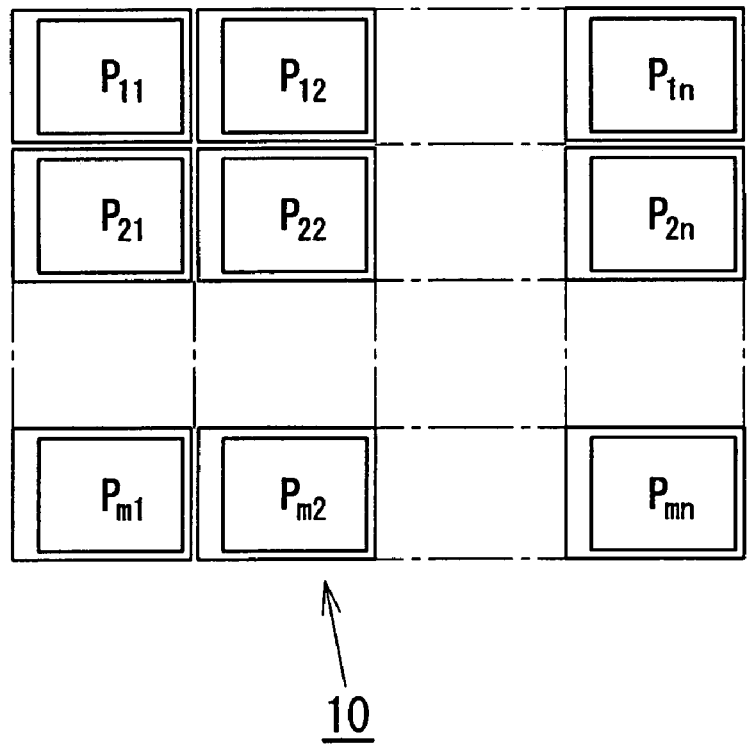
FIG. 1A is a schematic top plan view of a spread illuminating apparatus according to an embodiment of the present invention.
Figure 1B:
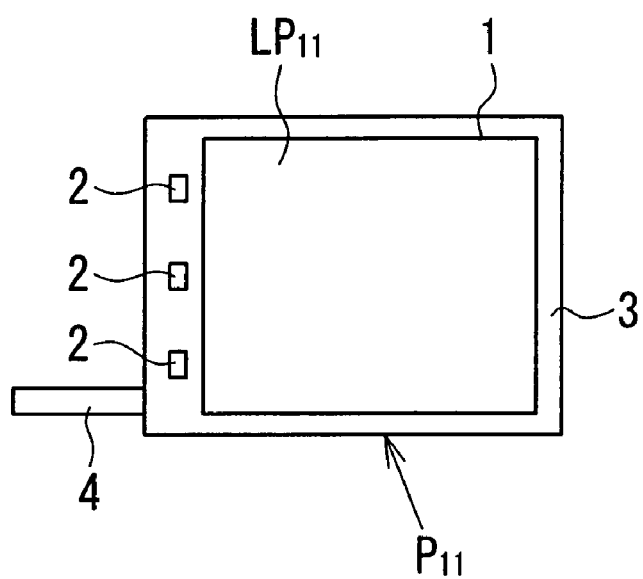
FIG. 1B is a top plan view of one of lighting units of the spread illuminating apparatus of FIG. 1A.

Referring to FIG. 1A, a spread illuminating apparatus 10 according to an embodiment of the present invention includes a plurality (m×n pieces in the figure) of lighting units $P_{11}$ to $P_{mn}$ arranged two dimensionally (in a matrix with m rows and n columns). The lighting units $P_{11}$ to $P_{mn}$ are of an edge light type and each principally include a light conductor plate 1 and LEDs 2 as light sources disposed at one side of the light conductor plate 1 as illustrated in FIG. 1B showing one lighting unit P11 as an example. In this connection, m and n may be natural numbers equal to 2 and larger and a detailed description of configuration examples will be made hereinafter.

The light conductor plate 1 is a rectangular plate formed of a transparent resin material. Acrylic resin, polycarbonate resin and amorphous polyolefin are well balanced in terms of moldability and optical property and therefore make a suitable material for the light conductor plate 1, while a transparent resin, such as polyester, polyolefin, fluorinated polymer, and epoxy, may alternatively be used. The light conductor plate 1 is suitably formed by injection molding which is excellent in terms of productivity and accuracy, while alternative resin molding methods may be used, such as thermal pressurization, extrusion and casting.

The LEDs 2 are constituted principally by pseudo white LEDs but may preferably include red LEDs for the purpose of enhancing color rending properties of light and also correcting color shift between the lighting units $P_{11}$ to $P_{mn}$. While the present invention is not limited to the LED arrangement described above, specifically, pseudo white LEDs mixed with red LEDs, the lighting units $P_{11}$ to $P_{mn}$ in the present embodiment are arranged such that lighting units incorporating only pseudo white LEDs as light sources are appropriately mixed with lighting units incorporating only red LEDs as light sources as appropriate.

The pseudo white LED is preferably constituted by a blue LED chip adapted to emit a blue light (with a dominant wavelength of, for example, 400 nm to 480 nm) and sealed with a transparent resin containing yttrium aluminum garnet (YAG) particles as fluorescent substances which absorb a light from the blue LED chip and emit a yellow light (with a dominant wavelength of, for example, 520 nm to 560 nm) and to which cerium is added for activation. The red LED may be constituted by a normal red LED to emit a red light (with a dominant wavelength of, for example, 600 nm to 700 nm).

The LEDs described above are mounted on a circuit substrate 4, specifically and typically a flexible printed circuit board (FPC). The circuit substrate 4 on which the light conductor plate 1 and the LEDs 2 are mounted is supported by a frame 3, thus constituting the lighting unit $P_{11}$. The circuit substrate 4 is connected to a driving circuit (not shown) to drive the LEDs 2. The driving circuit includes a control section adapted to turn on and off the lighting units $P_{11}$ to $P_{mn}$ independently of one another in a controlled manner and to dimmer-control the brightness of at least the red LED by, for example, increasing and decreasing the drive current.

The lighting unit $P_{11}$ functions as s surface light source such that light emitted from the LED 2 and introduced into the light conductor plate 1 exits from one major surface $LP_{11}$ (hereinafter referred to as "light emitting surface of a lighting unit" as appropriate) in a uniform manner while transmitting through the light conductor plate 1. With the structure described above, the spread illuminating apparatus 10 according to the present embodiment has its entire luminous region divided into a plurality of segment areas constituted respectively by the light emitting surfaces $LP_{11}$ to $LP_{mn}$ of the lighting units $P_{11}$ to $P_{mn}$ which can be turned on and off independently of one another.

Further, in the spread illuminating apparatus 10, electric gonio stages $G_{11}$ to $G_{mn}$ as angle adjusting means are provided respectively for the lighting units $P_{11}$ to $P_{mn}$. The electric gonio stages $G_{11}$ to $G_{mn}$ each include a stationary member 11 and a movable member 12 as illustrated in FIG. 2 showing one electric gonio stage $G_{11}$ as an example, wherein the movable member 12 is movably coupled to the stationary member 11 so as to rotate with respect to the stationary member 11 within a predetermined angle by means of a driving mechanism (not shown) which is connected via a cable 13 to a drive control circuit (not shown) to drive the driving mechanism.

Figure 2:
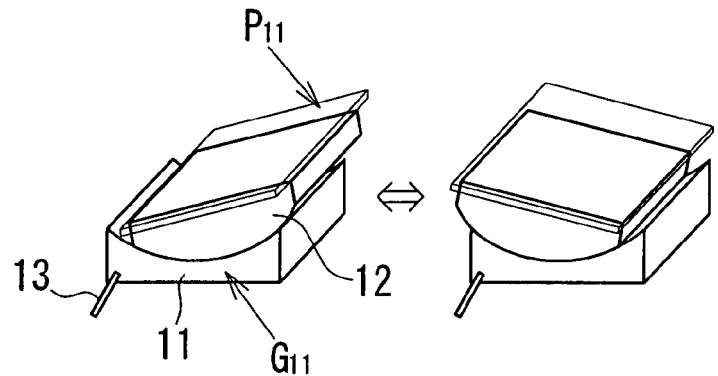
FIG. 2 is an explanatory perspective view of an electric gonio stage on which the one lighting unit of FIG. 1A is disposed.

Referring to FIG. 2, the lighting unit $P_{11}$ is schematically shown as a transparent plate and is disposed on the movable member 12 of the electric gonio stage $G_{11}$. The movable member 12 of the electric gonio stage $G_{11}$ is adapted to rotate uniaxially about a rotation center located out of the movable member 12 as demonstrated by two states of the movable member 12 shown in FIG. 2, and the rotation varies the inclination angle of the lighting unit $P_{11}$ relative to the stationary member 11. This operation occurs on all the electric gonio stages $G_{11}$ to $G_{mn}$ which have respective lighting units $P_{11}$ to $P_{mn}$ disposed on their movable members and which are driven by the aforementioned drive control circuit independently of one another in a controlled manner.

In the present embodiment, the spread illuminating apparatus 10 is usually arranged such that the stationary members 11 of the electric gonio stages $G_{11}$ to $G_{mn}$ are positioned and oriented in a fixed manner with respect to an object to be illuminated by the spread illuminating apparatus 10, and this arrangement enables independent setting and also dynamic adjustment of respective inclination angles of the lighting units $P_{11}$ to $P_{mn}$ (accordingly, the light emitting surfaces $LP_{11}$ to $LP_{mn}$ thereof) relative to the illuminated object within the moving range of the movable member 12.

Description will now be made on preferable configuration examples for the spread illuminating apparatus 10 of the present embodiment. In Tables 1 and 2 inserted below, the spread illuminating apparatus 10 is envisioned for use as a backlight for an LCD television, wherein various examples are shown with respective specifications suitable depending on screen sizes. In this connection, an average brightness required for a backlight is determined at 10000 $cd/m^2$ (note that brightness required at television screen is 500 $cd/m^2$ and transmittance of LCD panel is 5%). Table 1 shows examples which achieve the aforementioned average brightness by using two-inch lighting units each including four LEDs, and Table 2 shows examples which achieve the aforementioned average brightness by using eight-inch lighting units each including fifteen LEDs.

TABLE 1

Lighting unit (2 inches, 4 LEDs)

| | Screen size | | | |
|---|---|---|---|---|
| | 20 inches | 30 inches | 40 inches | 50 inches |
| Number of lighting units | 100 | 225 | 400 | 625 |
| Total number of LEDs | 400 | 900 | 1600 | 2500 |
| Average brightness (cd/m$^2$) | 10000 | 10000 | 10000 | 10000 |
| Electric power applied (W) | 50 | 112 | 200 | 312 |

TABLE 2

Lighting unit (8 inches, 15 LEDs)

| | Screen size | | | |
|---|---|---|---|---|
| | 20 inches | 30 inches | 40 inches | 50 inches |
| Number of lighting units | 6 | 14 | 25 | 39 |
| Total number of LEDs | 90 | 210 | 375 | 585 |
| Average brightness (cd/m$^2$) | 10000 | 10000 | 10000 | 10000 |
| Electric power applied (W) | 120 | 280 | 500 | 780 |

While the configuration incorporating 8 inch lighting units has an advantage in the aspect of cost, the configuration with 2 inch lighting units has an advantage in the aspect of independent control of segments areas of the luminous region of the spread illuminating apparatus 10 (to be described later) and also in the aspect of electric power applied. The electric power of the configuration with 2 inch lighting units is equivalent to that of a conventional direct light type backlight with CCFLs with respect to every screen size.

The spread illuminating apparatus 10 according to the present embodiment is suitable for use as a backlight for an LCD device, and the operation thereof will be described with reference to FIGS. 3 to 5.

Figure 3:
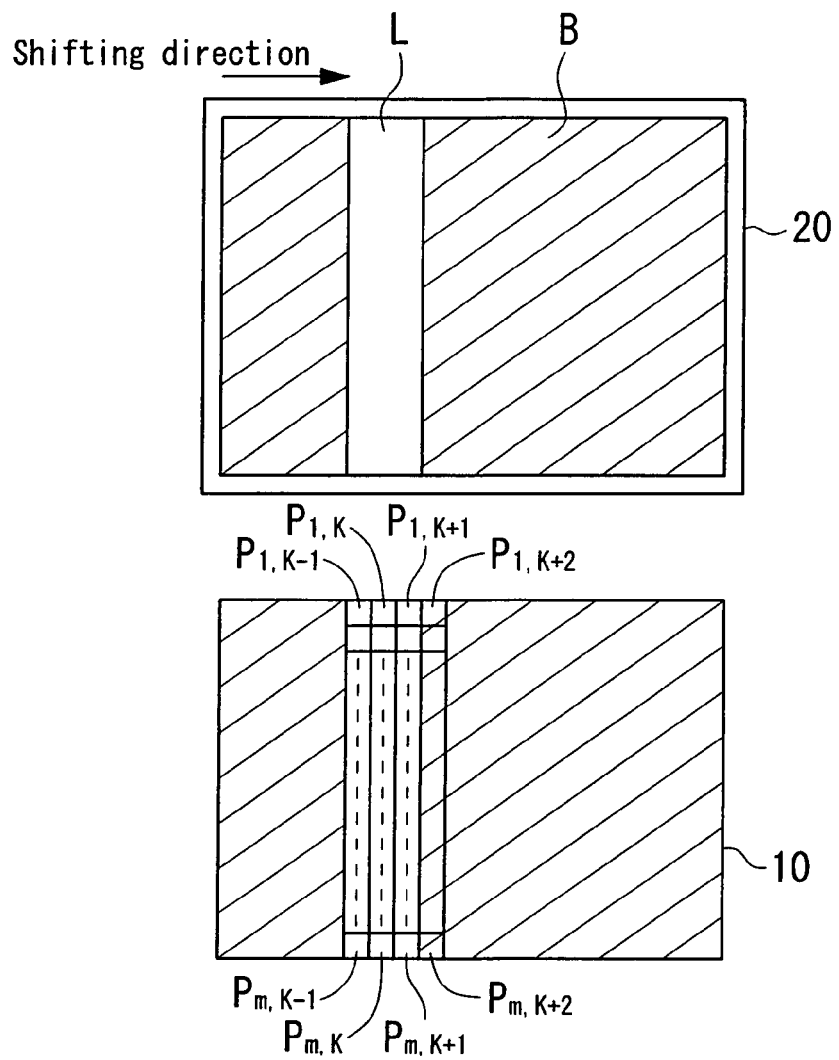
FIG. 3 is an explanatory view of an operation principle of a pseudo impulse driving in the spread illuminating apparatus of FIG. 1A.

FIG. 3 schematically shows an LCD panel 20 as an object to be illuminated by the spread illuminating apparatus 10 which is disposed beneath the LCD panel 20. At the LCD panel 20, a pseudo impulse driving is performed based on a black insertion driving method, such that a picture image region L with a picture image displayed thereat and a black region B indicated by hatching in the figure, which are both displayed and positioned on the screen as shown in FIG. 3 at a certain point of time, have their display positions shifting sequentially in synchronization with image scanning (in the embodiment shown in FIG. 3, the image region L shifts from the left to the right over one frame).

At the point of time shown in FIG. 3, at the spread illuminating apparatus 10, only lighting units constituting segment areas which are located immediately beneath the image region L of the LCD panel 20 (specifically, the lighting units $P_{1,k-1}$ to $P_{m,k-1}$ of column k-1, $P_{1,k}$ to $P_{m,k}$ of column k, and $P_{1,k+1}$ to $P_{m,k+1}$ of column k+1) are turned on, while the remaining lighting units constituting segment areas located immediately beneath the black region B are turned off. Then, when the display positions of the image region L and the black region B are caused to shift in synchronization of image scanning, the lighting units $P_{1,k-1}$ to $P_{m,k-1}$ of column k-1 are turned off at an appropriate point of time, and the lighting units $P_{1,k+2}$ to $P_{m,k+2}$ of column k+2 are turned on. With succession of the operation described above during display of picture image, an effective pseudo impulse drive is achieved for an LCD device.

In FIG. 3, the segment areas in the spread illuminating apparatus 10 corresponding to the image region L are constituted by a lighting unit group composed of the lighting units of three columns, but this is for explanation of one example only, and the segment areas are constituted by appropriate combinations of the lighting units $P_{11}$ to $P_{mn}$ according to various patterns of the image region L and the black region B at some point of time. Also, in case of scanning in the vertical (in the figure) direction, the lighting units $P_{11}$ to $P_{mn}$ can be easily turned on and off row by row, rather than column by column, in a controlled manner.

Further, in the spread illuminating apparatus 10 according to the present embodiment, the lighting units $P_{11}$ to $P_{mn}$ are turned on and off in a controlled manner independently of one another, and therefore what is called an "area control" can be easily implemented such that when a black region, which does not need illumination, is present in a picture image as a display tone factor, one or more lighting units constituting respective segment areas located directly beneath the black region are selectively turned off. Such an operation can be performed in conjunction with the above-described pseudo impulse driving, and, for example, when a black region as display tone factor of picture image is present in the image region L shown in FIG. 3, the spread illuminating apparatus 10 may be driven so as not to turn on lighting units located directly beneath the black region.

Description will now be made on the operation of the illuminating apparatus 10 according to the present embodiment when used as a backlight for a dual view LCD device. In the following explanation described with reference to FIGS. 4A, 4B and 5, the illuminating apparatus 10 includes twenty four lighting units arranged in four rows by six columns, but this is for convenience of explanation and illustration only and should not be taken as limiting.

Figure 4A:
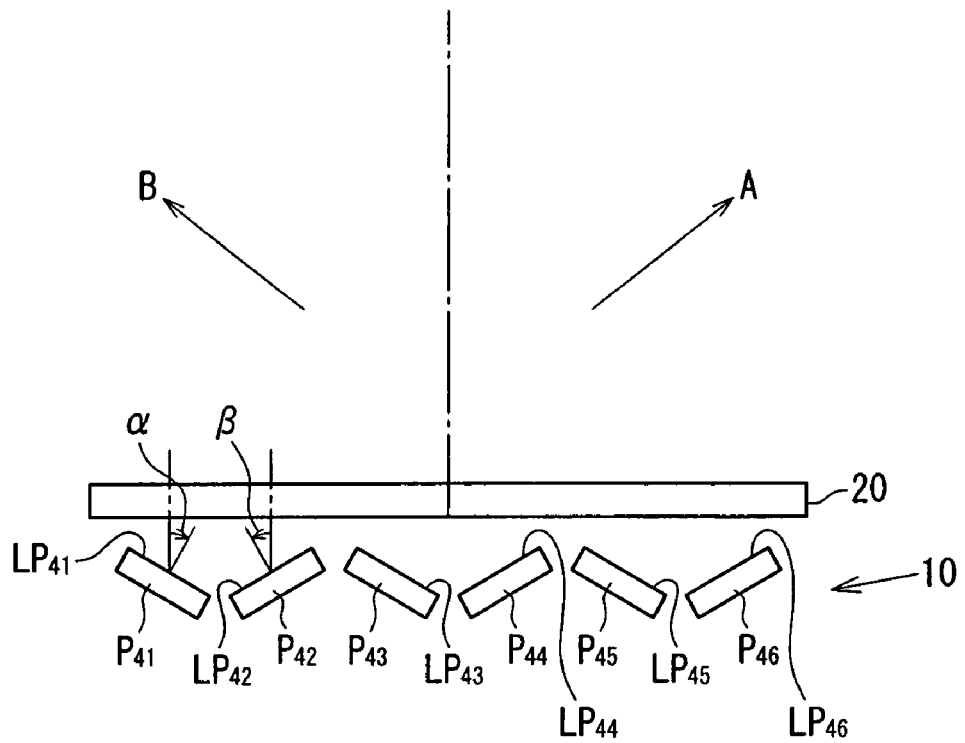
FIG. 4A is a schematic view of an operation principle of the spread illuminating apparatus of FIG. 1A used as a backlight for a dual view LCD device, showing a dual display mode viewed from a side of an LCD panel.
Figure 4B:
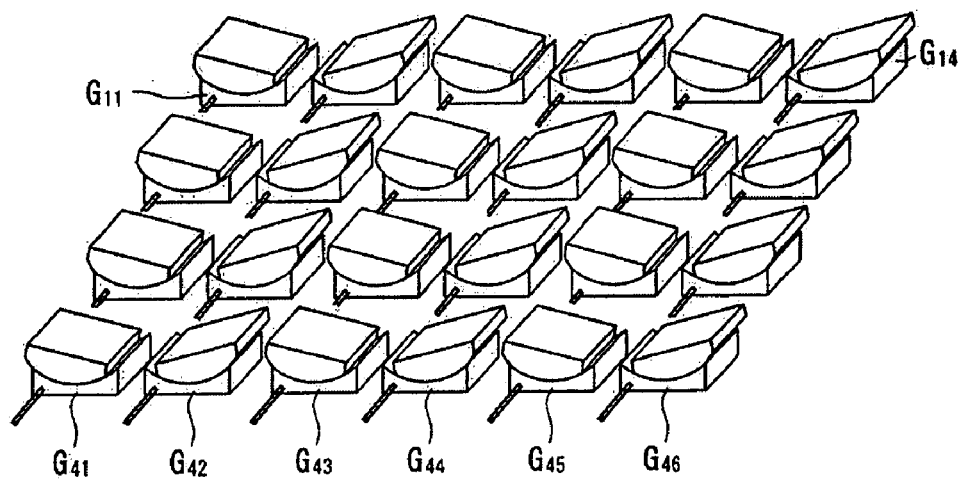
FIG. 4B is a perspective view of FIG. 4A, showing electric gonio stages.

FIG. 4A is a schematic side view of the LCD panel 20 for a dual view LCD device together with the spread illuminating apparatus 10 disposed behind the LCD panel 20. The LCD panel 20 includes pixels which constitute two different picture images A and B, wherein each of lights which are emitted from a backlight and transmit the pixels of the LCD panel 20 is controlled so as not to reach an area beyond a given space region corresponding to the pixel each light transmits, whereby the respective display directions (refer to arrows in the figure) of the picture images A and B are separated from each other, thus duly displaying two different picture images A and B at one single screen (hereinafter this display mode is referred to as "dual display mode" as appropriate).

Since all the lighting units $P_{11}$ to $P_{46}$ of the spread illuminating apparatus 10 are placed respectively on the electric gonio stages $G_{11}$ to $G_{46}$ which are controlled independently of one another, the inclinations of the lighting units $P_{11}$ to $P_{46}$ relative to the LCD panel 20 can be individually adjusted, and thereby a view angle characteristic suitable for the dual display mode is achieved. FIG. 4A shows only the lighting units $P_{41}$ to $P_{46}$ constituting the lowest row of all the lighting units $P_{11}$ to $P_{46}$ of the spread illuminating apparatus 10, and it is noted that the lighting units $P_{11/21/32}$ to $P_{16/26/36}$ of each of the other rows are configured following the inclination arrangement of the lighting units $P_{41}$ to $P_{46}$ of the lowest row.

Specifically, the lighting units $P_{11}$ to $P_{41}$ of the first column, the lighting units $P_{13}$ to $P_{43}$ of the third column, and the lighting units $P_{15}$ to $P_{45}$ of the fifth column, which constitute a first lighting unit group, are arranged with an inclination angle α with respect to the front view direction of the LCD panel 20 so that the respective light emitting surfaces $LP_{11}$ to $LP_{41}$, $LP_{13}$ to $LP_{43}$, and $LP_{15}$ to $LP_{45}$ face along the display direction of the picture image A, while the lighting units $P_{12}$ to $P_{42}$ of the second column, the lighting units $P_{14}$ to $P_{44}$ of the fourth column, and the lighting units $P_{16}$ to $P_{46}$ of the sixth column, which constitute a second lighting unit group, are arranged with an inclination angle β (normally −α) with respect to the front view direction of the LCD panel 20 so that the respective light emitting surfaces $LP_{12}$ to $LP_{42}$, $LP_{14}$ to $LP_{44}$, and $LP_{16}$ to $LP_{46}$ face along the display direction of the picture image B. An example arrangement state of the electric gonio stages $G_{11}$ to $G_{46}$ for achieving the inclination arrangement described above is specifically shown in FIG. 4B.

Thus, in the spread illuminating apparatus 10, the inclination angles of the lighting units $P_{11}$ to $P_{46}$ with respect to the LCD panel 20 are individually controlled thereby properly adjusting the view angle characteristic. As a result, an effective brightness for each display direction of the picture images A and B is enhanced without increasing electric power applied to the spread illuminating apparatus 10 (that is to say, without requiring to increase an actual brightness of the spread illuminating apparatus 10).

The inclination angle $\alpha$ (or $\beta$) is preferably set such that the peak direction of the lighting unit inclined by the angle $\alpha$ (or $\beta$) corresponds to the display direction of the picture image A (or B) (in other words, the peak direction falls within the range of an angle to define a space region where only the picture image A (or B) is viewable), and, for example, if the peak of the brightness distribution of the lighting units $P_{41}$ is directed in the front direction of the light emitting surface $LP_{41}$, the tangent line to the light emitting surface $LP_{41}$ and the display direction of the picture image A preferably correspond to each other.

In the composition of the dual display mode shown in FIG. 4A of the spread illuminating apparatus 10, even if the inclination angle $\alpha/\beta$ does not reach the angle preferably set as described above, a certain effect can be achieved insofar as the angle is set at a predetermined value that is not zero, and the inclination angle $\alpha/\beta$ is appropriately determined considering the specifications of the electric gonio stages, the space allowed in the spread illuminating apparatus 10, and the like.

Further, referring to FIG. 5, when the dual view LCD device displays one same picture image A in two different directions relative to the LCD panel 20 thereby presenting a display mode such that one picture image is viewed from the front (normal display mode) in the same way as a normal LCD device, the inclination angles of the lighting units $P_{11}$ to $P_{46}$ relative to the LCD panel 20 may be adjusted such that the light emitting surfaces $LP_{11}$ to $LP_{46}$ of all the lighting units $P_{11}$ to $P_{46}$ are oriented parallel to the LCD panel 20. Also, in some cases, the inclination angles of all the lighting units $P_{11}$ to $P_{46}$ may be set at the angle $\alpha$ (or $\beta$), whereby a view angle characteristic is achieved which is optimized in either one image display direction only.

Needless to say, the adjusting mechanism of the view angle characteristic of the spread illuminating apparatus 10 and the above-described lighting control mechanism per segment area can be combined together, and an LCD device can be further improved in picture quality and function by driving a duel view LCD device by a pseudo impulse driving method.

The present invention has been described with reference to the exemplary embodiment, but the spread illuminating apparatus of the present invention is not limited to the arrangement described above. For example, lighting units may be appropriately shaped, sized and arrayed according to the application and purpose of the spread illuminating apparatus, as long as the entire luminous area of the spread illuminating apparatus is divided into segments areas which allow individual independent lighting control.

Also, in the embodiment described above, the control mechanism of a view angle characteristic is explained with reference to a dual view LCD device, but the spread illuminating apparatus of the present invention can be applied to a multiple view LCD device which provides display directions for a plurality of picture images. For example, if the above-described electric gonio stages are structured to rotate biaxially, the spread illuminating apparatus can be adapted for a multiple view LCD device providing four different display directions.

The angle adjusting means in the present invention is not limited to the electric gonio stages as described above and may be otherwise structured, insofar as the inclination angle of the lighting unit relative to an object to be illuminated are variably adjustable, wherein the angle does not necessarily have to vary continuously.

And, if the view angle characteristic of the spread illuminating apparatus does not have to be adjusted dynamically, the lighting units may be fixedly disposed without using an angle adjusting means so as to be appropriately oriented respectively with respect to their corresponding display directions. Such a disposition arrangement, of course, includes a case where the light emitting surfaces of all the lighting units are oriented parallel to the object illuminated.

What is claimed is:

1. A spread illuminating apparatus of a liquid crystal display device, the spread illuminating apparatus comprising:
   a driving circuit having a control section adapted to control a plurality of lighting units by selectively and independently turning each lighting unit on or off; and
   a plurality of edge light type lighting units arranged two dimensionally in a matrix, each lighting unit comprising:
   a light conductor plate having one major surface as a light emitting surface,
   two or more light emitting diodes disposed at one side of the light conductor plate, the light emitting diodes including at least one pseudo white light emitting diode, and
   a circuit substrate on which the light conductor plate and the light emitting diodes are mounted, the circuit substrate being connected to the driving circuit,
   wherein light, emitted from the light emitting diodes and introduced into the light conductor plate, exits from the one major surface in a uniform manner through the light conductor plate, wherein each of the lighting units further comprises an angle adjusting means to adjust an inclination angle of light emitting surface of the light conductor plate with respect to the liquid crystal display device.

2. A spread illuminating apparatus according to claim 1, wherein the lighting units disposed two dimensionally comprise a lighting unit group constituted by at least one lighting unit in which the light emitting surface of the light conductor plate is inclined at a predetermined angle relative to an object to be illuminated.

3. A spread illuminating apparatus according to claim 1, wherein the light emitting diode includes a red light emitting diode.

4. A spread illuminating apparatus according to claim 2, wherein the light emitting diode includes a red light emitting diode.

5. A spread illuminating apparatus according to claim 1, wherein an entire illuminous region of the spread illuminating apparatus is divided into a plurality of segment areas, each of which is identical with the light emitting surface of each of the light units, and
   wherein only the segment areas facing a black region formed through a black insertion driving method are selectively turned off in synchronization with the black region to be shifted.

* * * * *